United States Patent
Hwang et al.

(10) Patent No.: US 10,425,212 B2
(45) Date of Patent: Sep. 24, 2019

(54) CARRIER INDICATOR FIELD USAGE AND CONFIGURATION IN CARRIER AGGREGATION

(71) Applicant: CELLULAR COMMUNICATIONS EQUIPMENT LLC, Plano, TX (US)

(72) Inventors: Woonhee Hwang, Espoo (FI); Jarkko T. Koskela, Oulu (FI); Esa M. Malkamaki, Espoo (FI)

(73) Assignee: CELLULAR COMMUNICATIONS EQUIPMENT LLC, Plano, TX (US)

( * ) Notice: Subject to any disclaimer, the term of this patent is extended or adjusted under 35 U.S.C. 154(b) by 970 days.

(21) Appl. No.: 14/558,083

(22) Filed: Dec. 2, 2014

(65) Prior Publication Data
US 2015/0085812 A1  Mar. 26, 2015

Related U.S. Application Data

(62) Division of application No. 13/247,323, filed on Sep. 28, 2011, now Pat. No. 8,902,770.
(Continued)

(51) Int. Cl.
*H04L 5/00* (2006.01)
*H04W 72/12* (2009.01)

(52) U.S. Cl.
CPC ............ *H04L 5/0091* (2013.01); *H04L 5/001* (2013.01); *H04L 5/0053* (2013.01); *H04W 72/1289* (2013.01)

(58) Field of Classification Search
CPC ..... H04L 5/0007; H04L 5/001; H04L 5/0053; H04L 5/0091; H04L 5/0037;
(Continued)

(56) References Cited

U.S. PATENT DOCUMENTS

| 8,340,069 | B2 | 12/2012 | Qu et al. ................ 370/343 |
| 8,359,039 | B2 | 1/2013 | McBeath et al. ............ 455/450 |

(Continued)

OTHER PUBLICATIONS

3GPP TS 36.331 V9.3.0 (Jun. 2010), Technical Specification, $3^{rd}$ Generation Partnership Project; Technical Specification Group Radio Access Network; Evolved Universal Terrestrial Radio Access (E-UTRA); Radio Resource Control (RRC); Protocol Specification (Release 9), whole document (250 pages).
(Continued)

*Primary Examiner* — Jung Liu
(74) *Attorney, Agent, or Firm* — Porcopio, Cory, Hargreaves & Savitch LLP

(57) ABSTRACT

Format of a downlink control channel for a user equipment UE is changed in conjunction with switching the UE between being enabled for cross carrier scheduling and being disabled for cross carrier scheduling. The changed format is used on at least one serving cell of the UE's configured set of component carriers CCs. In one embodiment the changed format comprises an explicit carrier indicator field CIF for the case in which the switching is from disabled to enabled; and the changed format has no explicit CIF when the switching is from enabled to disabled. In another embodiment switching from disabled to enabled comprises the UE's configured set of CCs being changed from one to multiple cells; and switching from enabled to disabled comprises the UE's configured set of CCs being changed from multiple cells to one cell. In one embodiment the changed format is implicit.

3 Claims, 13 Drawing Sheets

Related U.S. Application Data

(60) Provisional application No. 61/387,224, filed on Sep. 28, 2010.

(58) Field of Classification Search
CPC .... H04L 5/0078; H04L 5/0094; H04W 72/04; H04W 84/047; H04W 72/042; H04W 52/146; H04W 52/32; H04W 72/0406; H04W 52/34
See application file for complete search history.

(56) References Cited

U.S. PATENT DOCUMENTS

| | | | |
|---|---|---|---|
| 8,472,471 B2 | 6/2013 | Yang et al. | 370/464 |
| 8,548,513 B2 | 10/2013 | Yoon et al. | 455/509 |
| 8,705,467 B2 | 4/2014 | Korhonen et al. | 370/329 |
| 8,824,415 B2 | 9/2014 | Cheng et al. | 370/330 |
| 2010/0254329 A1* | 10/2010 | Pan | H04L 5/001 370/329 |
| 2010/0303011 A1 | 12/2010 | Pan et al. | 370/328 |
| 2010/0322158 A1 | 12/2010 | Lee et al. | 370/329 |
| 2011/0021191 A1* | 1/2011 | Damnjanovic | H04W 72/0406 455/434 |
| 2011/0070845 A1 | 3/2011 | Chen et al. | 455/91 |
| 2011/0079662 A1 | 4/2011 | Wang et al. | 239/240 |
| 2011/0268032 A1* | 11/2011 | Kim | H04L 1/1671 370/328 |
| 2012/0063321 A1* | 3/2012 | Chandrasekhar | H04L 1/0031 370/241 |
| 2012/0069795 A1* | 3/2012 | Chung | H04B 7/15542 370/315 |
| 2012/0069802 A1* | 3/2012 | Chen | H04L 5/001 370/329 |
| 2012/0320840 A1* | 12/2012 | Kim | H04L 5/001 370/329 |
| 2013/0044700 A1 | 2/2013 | Cheng et al. | 370/329 |
| 2013/0058291 A1* | 3/2013 | Ahn | H04L 5/0007 370/329 |
| 2013/0064190 A1* | 3/2013 | Hariharan | H04L 5/0053 370/329 |

OTHER PUBLICATIONS

3GPP TS 36.331 V9.2.0 (Mar. 2010), Technical Specification, $3^{rd}$ Generation Partnership Project; Technical Specification Group Radio Access Network; Evolved Universal Terrestrial Radio Access (E-UTRA); Radio Resource Control (RRC); Protocol Specification (Release 9), whole document (248 pages).

LG Electronics: "Handling of search space overlap for cross-carrier scheduling", 3GPP Draft; R1-103727 LTEA_PDCCH SS Handling, 3rd Generation Partnership Project (3GPP), Mobile Competence Centre ; 650, Route des Lucioles ; F-06921 Sophia-Antipolis Cedex ; France, vol. RAN WG1, No. Dresden, Germany; Jun. 28, 2010, Jun. 22, 2010 (Jun. 22, 2010), whole document, XP050449158.

CATT: "Discussion on remaining issues for GIF in LTE-A", 3GPP Draft; R1-103467, 3rd Generation Partnership Project (3GPP), Mobile Competence Centre ; 650, Route des Lucioles ; F-06921 Sophia-Antipolis Cedex ; France, vol. RAN WG1, No. Dresden, Germany; Jun. 28, 2010, Jun. 22, 2010 (Jun. 22, 2010), whole document, XP050448988.

\* cited by examiner

```
RadioResourceConfigDedicated
The IE RadioResourceConfigDedicated is used to setup/modify/release RBs, to modify the MAC main configuration, to modify
the SPS configuration and to modify dedicated physical configuration.
RadioResourceConfigDedicated information element -- ASN1START
RadioResourceConfigDedicated ::=    SEQUENCE {
    srb-ToAddModList                SRB-ToAddModList            OPTIONAL,   -- Cond HO-Conn
    drb-ToAddModList                DRB-ToAddModList            OPTIONAL,   -- Cond HO-toEUTRA
    drb-ToReleaseList               DRB-ToReleaseList           OPTIONAL,   -- Need ON
    mac-MainConfig                  CHOICE {
        explicitValue                   MAC-MainConfig,
        defaultValue                    NULL
    }                                                           OPTIONAL,   -- Cond HO-toEUTRA2
    sps-Config                      SPS-Config                  OPTIONAL,   -- Need ON
    physicalConfigDedicated         PhysicalConfigDedicated     OPTIONAL,   -- Need ON
    ...,
    [[ rlf-TimersAndConstants-r9    RLF-TimersAndConstants-r9   OPTIONAL    -- Need ON
    ]],
    [[ Ca-Config                    SEQUENCE {
        pcellPDCCHFormatWithCIF         UsePDCCHFormatWithCIF,
        dft-S-OFDM-Index-vax0           INTEGER (0..2047)       OPTIONAL,   -- Value range is FFS
        secCellToAddModList-r10         SecCellToAddModList-r10 OPTIONAL    -- Need/ cond FFS
    },
    secCellToReleaseList-r10        SecCellToReleaseList-r10    OPTIONAL    -- Need
    ]]
```

```
SRB-ToAddModList ::=       SEQUENCE (SIZE (1..2)) OF SRB-ToAddMod
SRB-ToAddMod ::= SEQUENCE {
    srb-Identity                INTEGER (1..2),
    rlc-Config                  CHOICE {
        explicitValue               RLC-Config,
        defaultValue                NULL
    }                                                   OPTIONAL,    -- Cond Setup
    logicalChannelConfig        CHOICE {
        explicitValue               LogicalChannelConfig,
        defaultValue                NULL
    }                                                   OPTIONAL,    -- Cond Setup
~~~
DRB-ToAddModList ::=       SEQUENCE (SIZE (1..maxDRB)) OF DRB-ToAddMod
DRB-ToAddMod ::= SEQUENCE {
    eps-BearerIdentity          INTEGER (0..15)         OPTIONAL,    -- Cond DRB-Setup
    drb-Identity                DRB-Identity,
    pdcp-Config                 PDCP-Config             OPTIONAL,    -- Cond PDCP
    rlc-Config                  RLC-Config              OPTIONAL,    -- Cond Setup
    logicalChannelIdentity      INTEGER (3..10)         OPTIONAL,    -- Cond DRB-Setup
    logicalChannelConfig        LogicalChannelConfig    OPTIONAL,    -- Cond Setup
~~~
DRB-ToReleaseList ::=      SEQUENCE (SIZE (1..maxDRB)) OF DRB-Identity
SecCellToAddModList-r10 ::= SEQUENCE (SIZE (1..maxSecCell-r10)) OF SecCellToAddMod-r10
SecCellToAddMod-r10 ::=    SEQUENCE {
```

FIG.4A-2

```
secCellIndex-r10            ServCellIndex-r10,
dl-Config-r10               DL-Config-r10                OPTIONAL,  -- Cond SCellSetup
ul-Config-r10               UL-Config-r10                OPTIONAL,  -- Need ON
x-SchedulingConfig          X-SchedulingConfig-r10       OPTIONAL,  -- Need ON
...

-- SCell DL related parameters
DL-Config-r10 ::=  SEQUENCE {
    physCellId-r10              PhysCellId
    dl-CarrierFreq              ARFCN-ValueEUTRA
    dl-carrierBandwidth         CarrierBandwidthEUTRA
    -- PDSCH parameters
    pdsch-ConfigCommon          PDSCH-ConfigCommon                   OPTIONAL,  -- Cond SCellSetup
    pdsch-ConfigDedicated       PDSCH-ConfigDedicated                OPTIONAL,  -- Cond SCellSetup
    cqi-ReportConfig            CQI-ReportConfig                     OPTIONAL,  -- Cond SCellSetup -- cqi-PUCCH-ResourceIndex is not needed. So 11 bits are wasted unless defining a new group for the rest of the parameter.
    -- The rest of the parameters in the cqi-ReportPeriodic can be defined per DL SCell separately.
    pmi-RI-Report-r9            ENUMERATED {setup}                   OPTIONAL,  -- Cond SCellSetup
                                                                     OPTIONAL,  -- Need ON
                                                                     OPTIONAL,  -- Need ON
    -- In cqi-ReportConfig-v920 only pmi-RI-Report-r9 needs to be configured per SCell but cqi-Mask-r9 is configured per PCell.
    scellPDSCH-FormatWithCIF    UsePDCCHFormatWithCIF,               OPTIONAL,  -- Cond PMIRI -- Antenna parameter
    antennaInfoCommon           AntennaInfoCommon
    antennaInfo                 CHOICE {
        explicitValue               AntennaInfoDedicated,            OPTIONAL,  -- Need ON
        defaultValue                NULL
    }
    antennaInfo-v920            AntennaInfoDedicated-v920            OPTIONAL,  -- Need ON
                                                                     OPTIONAL,  -- Need ON
```

FIG.4B

```
-- TDD specific parameters
tdd-Parameter              SEQUENCE {
    prach-ConfigIndex      INTEGER (0..63),
    prach-FreqOffset       INTEGER (0..94)
    ...
}                          OPTIONAL,    -- Need ON -- PROPOSAL 2: crossCarrierScheduling related parameters
X-SchedulingConfig-r10 ::= CHOICE {
    notCrossScheduledFromOtherCell   SEQUENCE {
        -- PDCCH related parameter
        pdcch-Config                 SEQUENCE {
            phich-Config             PHICH-Config,
            ...
        },
        ...
    },
    crossScheduledFromOtherCell      SEQUENCE {
        cif                          CIF,
        -- CIF value used for this cell on PDCCH. Assumed to be common for UL&DL
                                     cfi-Value
        -- Control format indicator indicates the starting OFDM sysmbol of cross-scheduled PDSCH
        schedulingCellIndex          ServCellIndex-r10,
        -- Indication of the CellIndex of the scheduling cell
        ...
    }
}

SecCell-ToReleaseList-r10 ::= SEQUENCE (SIZE (1..maxSecCell-r10)) OF CellIndex-r10

CIF ::=                    INTEGER (1..7)
-- Do we need to fix Scheduling Cell = CIF-DL (0)? Different CIF for UL and DL?

-- ASN1STOP
```

FIG.4C-1

| RadioResourceConfigDedicated FIELD DESCRIPTIONS |
|---|
| srb-Identity<br>VALUE 1 IS APPLICABLE FOR SRB1 ONLY<br>VALUE 2 IS APPLICABLE FOR SRB2 ONLY |
| rlc-Config<br>FOR SRBs A CHOICE IS USED TO INDICATE WHETHER THE RLC CONFIGURATION IS SIGNALLED EXPLICITLY OR SET TO THE VALUES DEFINED IN THE DEFAULT RLC CONFIGURATION FOR SRB1 IN 9.2.1.1 OR FOR SRB2 IN 9.2.1.2. RLC AM IS THE ONLY APPLICABLE RLC MODE FOR SRB1 AND SRB2. E-UTRAN DOES NOT RECONFIGURE THE RLC MODE OF DRBs EXCEPT WHEN A FULL CONFIGURATION OPTION IS USED, AND MAY RECONFIGURE THE UM RLC SN FIELD SIZE ONLY UPON HANDOVER WITHIN E-UTRA OR UPON THE FIRST RECONFIGURATION AFTER RRC CONNECTION RE-ESTABLISHMENT |
| mac-MainConfig<br>ALTHOUGH THE ASN.1 INCLUDES A CHOICE THAT IS USED TO INDICATE WHETHER THE Mac-MainConfig IS SIGNALLED EXPLICITLY OR SET TO THE DEFAULT MAC MAIN CONFIGURATION AS SPECIFIED IN 9.2.2, EUTRAN DOES NOT APPLY "defaultValue" |
| sps-Config<br>THE DEFAULT SPS CONFIGURATION IS SPECIFIED IN 9.2.3. |
| physicalConfigDedicated<br>THE DEFAULT DEDICATED PHYSICAL CONFIGURATION IS SPECIFIED IN 9.2.4. |
| logicalChannelConfig<br>FOR SRBs A CHOICE IS USED TO INDICATE WHETHER THE LOGICAL CHANNEL CONFIGURATION IS SIGNALLED EXPLICITLY OR SET TO THE DEFAULT LOGICAL CHANNEL CONFIGURATION FOR SRB1 AS SPECIFIED IN 9.2.1.1 OR FOR SRB2 AS SPECIFIED IN 9.2.1.2. |
| logicalChannelIdentity<br>THE LOGICAL CHANNEL IDENTITY FOR BOTH UL AND DL |

FIG.4C-2

| FIG.4C-1 |
|---|
| FIG.4C-2 |

FIG.4C

| CONDITIONAL PRESENCE | EXPLANATION |
|---|---|
| DRB-Setup | THE FIELD IS MANDATORY PRESENT IF THE CORRESPONDING DRB IS BEING SET UP; OTHERWISE IT IS NOT PRESENT |
| PDCP | THE FIELD IS MANDATORY PRESENT IF THE CORRESPONDING DRB IS BEING SETUP; THE FIELD IS OPTIONALLY PRESENT, NEED ON, UPON HANDOVER WITHIN E-UTRA AND UPON THE FIRST RECONFIGURATION AFTER RE-ESTABLISHMENT BUT IN BOTH THESE CASES ONLY WHEN fullConfig IS NOT INCLUDED IN THE RRCConnectionReconfiguration MESSAGE; OTHERWISE IT IS NOT PRESENT |
| Setup | THE FIELD IS MANDATORY PRESENT IF THE CORRESPONDING SRB/DRB IS BEING SETUP; OTHERWISE THE FIELD IS OPTIONALLY PRESENT, NEED ON |
| HO-Conn | THE FIELD IS MANDATORY PRESENT IN CASE OF HANDOVER TO E-UTRA OR WHEN THE fullConfig IS INCLUDED IN THE RRCConnectionReconfiguration MESSAGE OR IN CASE OF RRC CONNECTION ESTABLISHMENT; OTHERWISE THE FIELD IS OPTIONALLY PRESENT, NEED ON. UPON CONNECTION ESTABLISHMENT/RE-ESTABLISHMENT ONLY SRB1 IS APPLICABLE |
| HO-toEUTRA | THE FIELD IS MANDATORY PRESENT IN CASE OF HANDOVER TO E-UTRA OR WHEN THE fullConfig IS INCLUDED IN THE RRCConnectionReconfiguration MESSAGE; IN CASE OF RRC CONNECTION ESTABLISHMENT AND RRC CONNECTION RE-ESTABLISHMENT THE FIELD IS NOT PRESENT; OTHERWISE THE FIELD IS OPTIONALLY PRESENT, NEED ON |
| HO-toEUTRA2 | THE FIELD IS MANDATORY PRESENT IN CASE OF HANDOVER TO E-UTRA OR WHEN THE fullConfig IS INCLUDED IN THE RRCConnectionReconfiguration MESSAGE; OTHERWISE THE FIELD IS OPTIONALLY PRESENT, NEED ON |
| SCellSetup | THIS FIELD IS MANDATORY PRESENT IF THE NEW SCELL IS CONFIGURED; OTHERWISE THE FIELD IS OPTIONALLY PRESENT, NEED ON |

FIG.4D

CARRIER INDICATOR FIELD USAGE AND CONFIGURATION IN CARRIER AGGREGATION

CROSS REFERENCE TO A RELATED APPLICATION

This application is a divisional of U.S. patent application Ser. No. 13/247,323, filed Sep. 28, 2011, which claims the benefit of U.S. Provisional Application SN 61/387,224, filed on Sep. 28, 2010, the disclosures of which is incorporated herein by reference in its entirety.

TECHNICAL FIELD

The exemplary and non-limiting embodiments of this invention relate generally to wireless communication systems, methods, devices and computer programs and, more specifically, relate to cross carrier scheduling and carrier indicator field usage in a communication system using carrier aggregation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
  3GPP third generation partnership project
  CA carrier aggregation
  CC component carrier
  CIF carrier indicator field
  CQI channel quality indication
  DCI downlink control indication
  DL downlink (eNB to UE)
  eNB EUTRAN Node B (evolved Node B/base station)
  E-UTRAN evolved UTRAN (LTE)
  IMT international mobile telecommunications
  ITU-R international telecommunication union - radio
  LTE long term evolution
  LTE-A long term evolution-advanced
  MME mobility management entity
  MIMO multiple input multiple output
  MU multi-user
  PCC primary CC (also termed PCell)
  PDCCH physical downlink control channel
  PDSCH physical downlink shared channel
  PUSCH physical uplink shared channel
  RLF radio link failure
  RRC radio resource control
  SCC secondary CC (also termed SCell)
  UE user equipment
  UL uplink (UE to eNB)
  UTRAN universal terrestrial radio access network FIG. 1 shows the overall architecture of the E-UTRAN system, in which eNBs are interconnected with each other by means of an X2 interface and which provide the EUTRA user plane and control plane (RRC) protocol terminations towards the UE. The eNBs are also connected by means of an S1 interface to a MME and to a Serving Gateway.

Future releases of 3GPP LTE are targeted towards future IMT-Advanced systems, referred to herein for convenience simply as LTE-Advanced (LTE-A) which is expected to be part of LTE Release 10. LTE-A is expected to use a mix of local area and wide area optimization techniques to fulfill the ITU-R requirements for IMT-Advanced while keeping the backward compatibility with LTE Release 8. Topics that are included within the ongoing study item includes bandwidth extensions beyond 20 MHz, relays, cooperative MIMO and multi-user MIMO, and single user MIMO on the uplink.

The bandwidth extension beyond 20 MHz in LTE-Advanced is to be done via carrier aggregation CA, in which multiple component carriers CCs are aggregated together to form a larger bandwidth. This is shown by example at FIG. 1B in which there are 5 Release 8 compatible CCs aggregated to form one larger LTE-Advanced bandwidth. The purpose for aggregating individual 20 MHz Release 8 compatible component carriers (CCs) is that each existing Release 8 terminal can receive and/or transmit on one of the CCs, whereas future LTE-Advanced terminals could potentially receive/transmit on multiple CCs at the same time. FIG. 1B is exemplary; in practice there may be more or less than five CCs, they may not have equal bandwidths, and/or they may be frequency non-adjacent. The CCs could be aggregated in both TDD and FDD systems.

In LTE Release 8, the PDCCH could only be used to indicate a PDSCH/PUSCH sent on its own DL CC or its paired UL CC. In LTE-Advanced, "cross-scheduling" can be available, which means the PDCCH could be used to indicate PDSCH/PUSCH resources sent on other CCs other than its own DL CC and/or its paired UL CC. From the perspective of the transmitted PDCCH this cross-scheduling is useful for distributing traffic loads among the multiple carriers.

One problem in cross carrier scheduling arises in that there are different formats for the PDCCH. Note that 3GPP TS 36.331 v9.3.0 (2010-06) uses the term cell (e.g., PCell or SCell) rather than component carrier. By convention the PCell is the serving cell on the primary component carrier and the SCell is the serving cell on any secondary component carrier. In the case of cross carrier scheduling, a CIF should be included in the PDCCH to indicate which cell (or which CC) is scheduled. Thus depending on whether cross carrier scheduling is used or not the PDCCH format can be different meaning the UE should interpret the PDCCH differently. In case CA is not used, the PDCCH format used will be the same as in LTE Releases 8/9 and it is expected there will be no CIF signaled. The eNB can add a SCell for a UE which has only a PCell configured, and similarly withdraw a SCell from a UE leaving it with only a PCell. In both cases the eNB and the UE each need to have a clear understanding of what PDCCH format is in use at any given time on any given cell.

SUMMARY

The foregoing and other problems are overcome, and other advantages are realized, by the use of the exemplary embodiments of this invention.

In a first aspect thereof the exemplary embodiments of this invention provide a method comprising: changing format of a downlink control channel for a user equipment in conjunction with switching the user equipment between being enabled for cross carrier scheduling and being disabled for cross carrier scheduling; and thereafter using the changed format of the downlink control channel on at least one serving cell of the user equipment's configured set of component carriers.

In a second aspect thereof the exemplary embodiments of this invention provide an apparatus, comprising at least one processor and at least one memory including computer program code. The at least one memory and the computer program code are configured to, with the at least one processor, cause the apparatus at least to perform: changing format of a downlink control channel for a user equipment in conjunction with switching the user equipment between being enabled for cross carrier scheduling and being disabled for cross carrier scheduling; and thereafter using the changed format of the downlink control channel on at least one serving cell of the user equipment's configured set of component carriers.

In a third aspect thereof the exemplary embodiments of this invention provide a memory storing a program of computer readable instructions that when executed by a processor result in actions comprising: changing format of a downlink control channel for a user equipment in conjunction with switching the user equipment between being enabled for cross carrier scheduling and being disabled for cross carrier scheduling; and thereafter using the changed format of the downlink control channel on at least one serving cell of the user equipment's configured set of component carriers.

In a fourth aspect thereof the exemplary embodiments of this invention provide an apparatus comprising storing means and processing means. The storing means is for storing a changed format of a downlink control channel for a user equipment in conjunction with a switch of the user equipment between being enabled for cross carrier scheduling and being disabled for cross carrier scheduling. The processing means is for using the changed format of the downlink control channel on at least one serving cell of the user equipment's configured set of component carriers. In a particular embodiment, the storing means comprises a computer readable memory and the processing means comprises a digital processor.

In a fifth aspect thereof the exemplary embodiments of this invention provide a method comprising: changing format of a downlink control channel for a user equipment from a format which has no explicit carrier indicator field to a format that which has an explicit carrier indicator field; and thereafter switching the user equipment from being disabled for cross carrier scheduling to being enabled for cross carrier scheduling.

These and other aspects of the invention are detailed more fully below.

BRIEF DESCRIPTION OF THE DRAWINGS

FIGS. 4A-D are a continuous table for replacing a similar information element described at 3GPP TS 36.331 to enable a specific implementation of the second embodiment of the invention detailed herein.

DETAILED DESCRIPTION

Figure 1A:
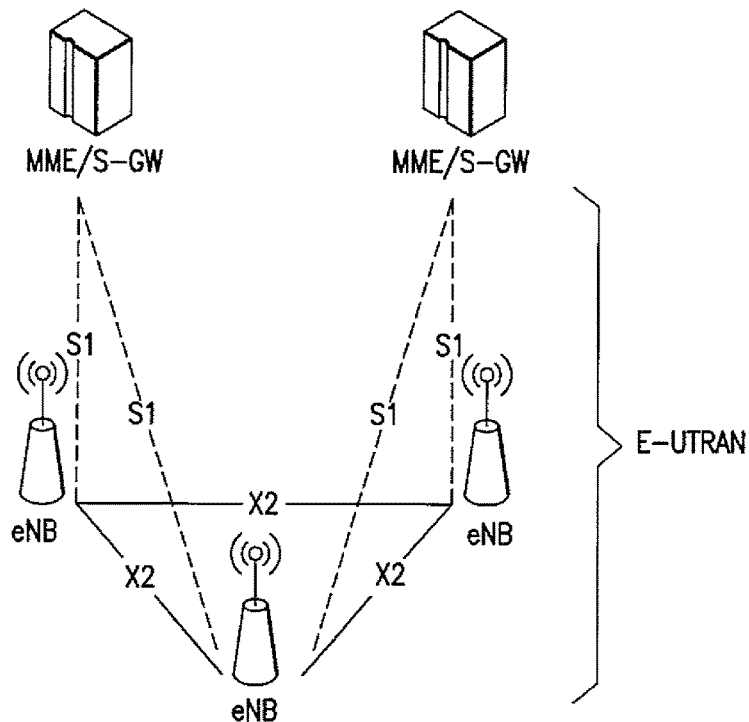
FIG. 1A shows the overall architecture of the E-UTRAN system.
Figure 1B:
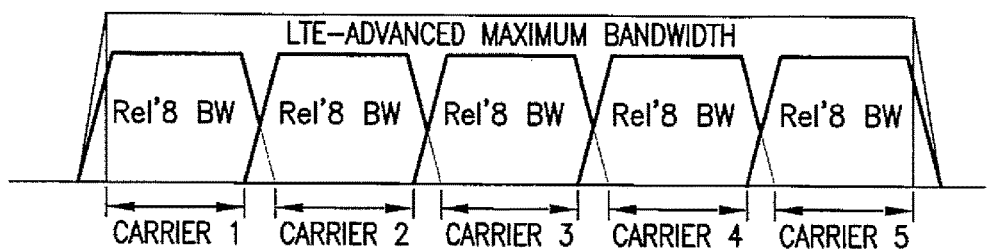
FIG. 1B is a schematic diagram of a radio spectrum in which cross-scheduling can be employed, in which five component carrier bandwidths are aggregated into a single LTE-Advanced bandwidth.

Conventionally, for the case in which a PDCCH on a cell assigns PDSCH resources on the same cell and PUSCH resources on a single linked UL cell, there is no CIF (field) in the PDCCH and the LTE Release 8 PDCCH structure is used (e.g., same coding, same CCE-based resource mapping, and same DCI formats). And when cross-carrier scheduling is implemented where a PDCCH on one cell assigns PDSCH and/or PUSCH resources in a different and/or un-linked cell, the CIF (field) will be used. The CIF (field) extends the LTE Release 8 DCI formats by 3 bits, the length of the CIF.

But when the eNB adds a SCell that is scheduled with CIF, it may happen that also scheduling of the existing PCell and/or SCell changes. Consider an example: a UE is initially configured with only one serving cell, its PCell which is scheduled normally with the CIF-less format. Later a SCell is added which is supposed to be scheduled with CIF from the PCell from which the SCell is cross-scheduled. The UE is supposed to be decoding only one PDCCH format from a cell, but in the above example it appears the UE should decode both the CIF format and the CIF-less format from the PCell. This is because the UE will not know if that a particular PDCCH is using cross carrier scheduling until it decodes that PDCCH. A similar problem arises if the eNB removes the SCell and leaves the UE with only the PCell configured; the UE will not know whether or not the next PDCCH includes the CIF field. This problem is especially problematic when the SCell configuration indicates from which cell the SCell is being scheduled.

According to an embodiment of the invention, the format of a downlink control channel is changed for a user equipment in conjunction with switching the user equipment between being enabled for cross carrier scheduling and being disabled for cross carrier scheduling; and thereafter the changed format of the downlink control channel is used at least in one serving cell on the user equipment's configured set of component carriers. Each component carrier in the UE's configured set is alternatively termed a serving cell, regardless of whether it is the PCell or an SCell.

Stating in this manner reads on both the eNB and on the UE. For the case of the eNB, the eNB switches the UE between being enabled for cross carrier scheduling and being disabled for cross carrier scheduling by sending to the UE a Connection Reconfiguration message as is detailed below in both exemplary embodiments, and the eNB uses the changed format of the downlink control channel on the UE's configured set of component carriers when it transmits the downlink control channel in the changed format on at least one of the UE's configured set of component carriers. For the case of the UE, the UE switches between being enabled for cross carrier scheduling and being disabled for cross carrier scheduling by adding or removing a component carrier from its configured set according to a Connection Reconfiguration message which the UE receives from the network according to both exemplary embodiments detailed below. In this case the UE uses the changed format of the downlink control channel on its configured set of component carriers by decoding the downlink control channel using the changed format. The UE gets the PDCCH with the changed format on at least one of its configured set of component carriers.

Below are detailed two specific implementations for the above general solution to the problem identified for cross-carrier scheduling. In a first exemplary embodiment there are implicit rules defined and understood by both the eNB and the UE so that the UE and the network know which PDCCH format (with or without CIF) should be used. The end result of these rules in all cases is that the UE is not required to decode two types of PDCCH formats simultaneously on any given component carrier (or serving cell). In a second exemplary embodiment of the invention the eNB (or more generally the network) clearly and explicitly indicates whether or not the PDCCH format is to be changed. The end result of such signaling in all cases is that the UE is not required to decode two types of PDCCH formats simultaneously on any given component carrier.

Figure 2:
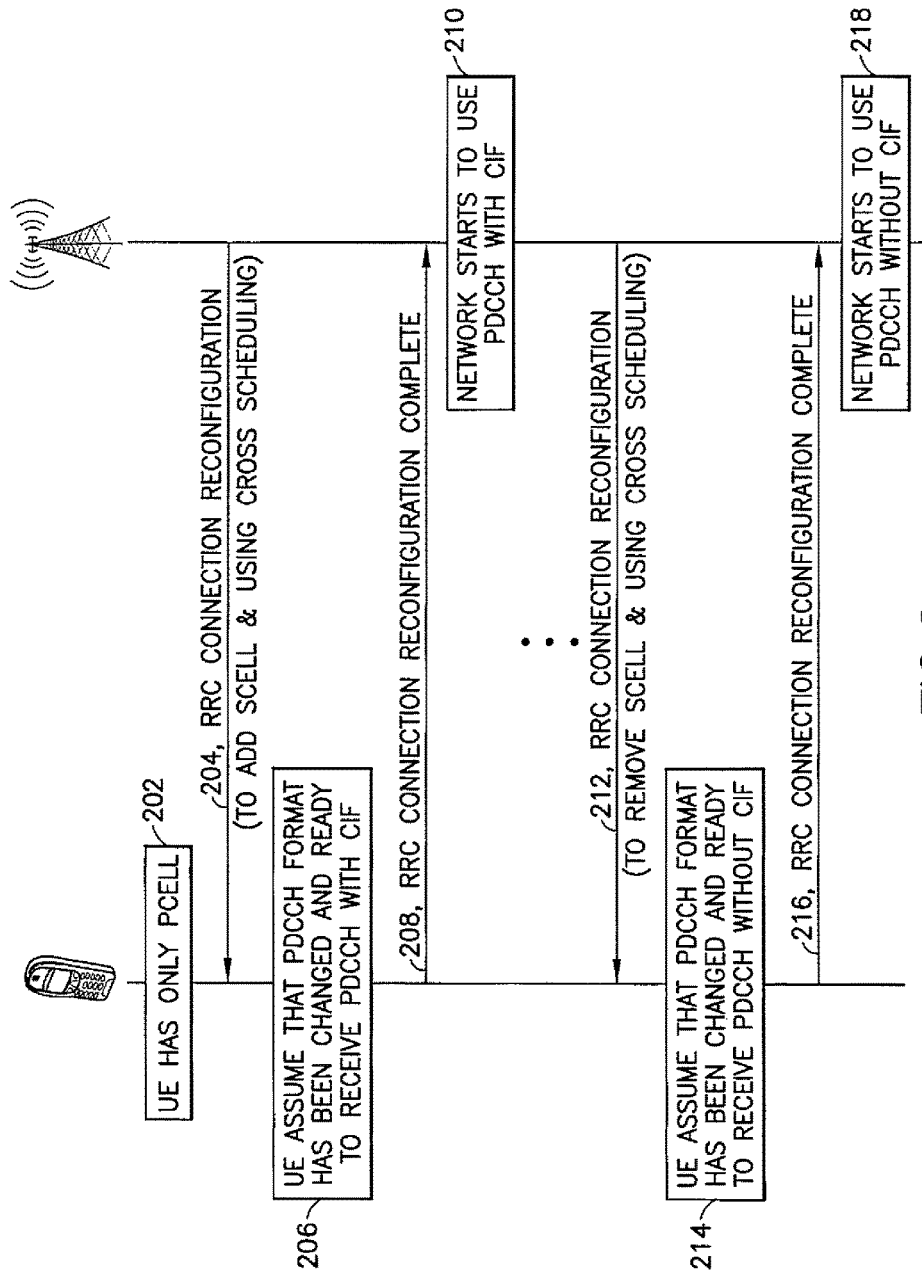
FIG. 2 is an exemplary signaling diagram by which the PDCCH format in a cross-scheduled cell is implicit from the addition or withdrawal of a SCell from a UE's configured component carrier set according to an exemplary embodiment of the invention.

The first exemplary embodiment is detailed with respect to the example signaling diagram at FIG. 2. As a starting point the UE 10 is configured at 202 with only one CC, its PCell. The eNB then adds to the UE's configured set one or more secondary CCs (SCells) and configures it or them for cross-carrier scheduling, which FIG. 2 shows to be accomplished via a RRC Connection Reconfiguration message 204. This switches the UE from disabled for cross-carrier scheduling (since there can be no cross-carrier scheduling if the UE has only the PCell) to being enabled for cross carrier scheduling. Using implicit rules which are understood a priori by both the eNB 12 and the UE 10, at block 206 the UE changes its PDCCH format from the Release-8 non-CIF format to the LTE-A CIF indicated format, and confirms its compliance with the RRC Connection Reconfiguration message 204 by sending to the eNB 12 a RRC Connection Reconfiguration Complete message 208. Upon receipt of this message 208 the eNB 12 begins to use the PDCCH format including the CIF at 210.

The remainder of FIG. 2 illustrates the reverse situation, where the UE's configured CC set is reduced from more than one cell to only the PCell. The eNB 12 sends to the UE 10 a new RRC Connection Reconfiguration message 212 which removes all the SCells (alternatively this new message 212 may simply indicate that cross-scheduling will not be used, and may or may not also withdraw configured SCells from the UE's configured set). This switches the UE from enabled for cross-carrier scheduling to being disabled for cross carrier scheduling. The UE in response at block 214 assumes from the implicit rules that the PDCCH format has been changed back to the LTE Release-8 format with no CIF, and readies itself to receive PDCCHs of that non-CIF format. The UE then sends a new RRC Connection Reconfiguration Complete message 216, which causes the eNB 12 upon receipt to begin to use the PDCCH having the format corresponding to no CIF at 218.

Stated generally, this first embodiment means that whenever there is a change which disables cross-carrier scheduling for a UE (i.e., cross carrier scheduling is not used), then the PDCCH format is kept as the CIF-less format. For example if there is only PCell configured for UE then it will always use the CIF-less format by default. But if there is a change which enables cross-carrier scheduling for a UE (i.e. CIF format is needed in the PCell), then the PCell will utilize the CIF format instead for all resource allocations. And if this SCell configuration is removed (and no other configuration exists indicating the UE can be cross-scheduled from the PCell), this is again the change first stated above which disables cross carrier scheduling and the CIF-less format for PDCCH will be used again.

As one example of such a rule detailed above, the rules could be a) when the UE receives the RRC Connection Reconfiguration message 212 to remove the last cross scheduled cell from the UE's configured CC set, then further PDCCHs will use a format that does not utilize CIF format; and b) when the UE receives the RRC Connection Reconfiguration message 204 to add the first cross scheduled cell to the UE's configured CC set, then further PDCCHs will use a format that does utilize CIF format. By example, such rules may be stipulated in a wireless standard such as for example for LTE-A, and stored in a local memory of both the UE 10 and the eNB 12 for implementation as shown at FIG. 2.

According to the second exemplary embodiment, there is explicit signaling on each cell (on the PCell and any SCells configured for the UE) indicating which PDCCH format will be used on this cell. For this embodiment, FIG. 2 would be modified such that there is some additional RRC signaling, by example at message 204 to indicate when the UE is to use the PDCCH with CIF and optionally also at message 212 that the UE should no longer use the PDCCH with CIF. But with this second embodiment since there is explicit signaling the eNB may choose to use the PDCCH with CIF for the case in which the UE is configured only with the PCell. This embodiment may require some extra signaling for the potential scheduling cell even for the case in which cross carrier scheduling is not actually used. This second embodiment therefore may in certain implementations require new parameters for the PCell in order to indicate the used PDCCH format. One could also indicate in the same signaling which cells are being scheduled from this cell.

Further, if the network/eNB 12 always wants to use PDCCH without CIF in the case that cross carrier scheduling is not used, additional signaling may also be required since whenever a new cell is added or removed using the CIF format then the format used in the scheduling cell could be changed if there are no other cells that require cross carrier scheduling from this cell.

Figure 3A:
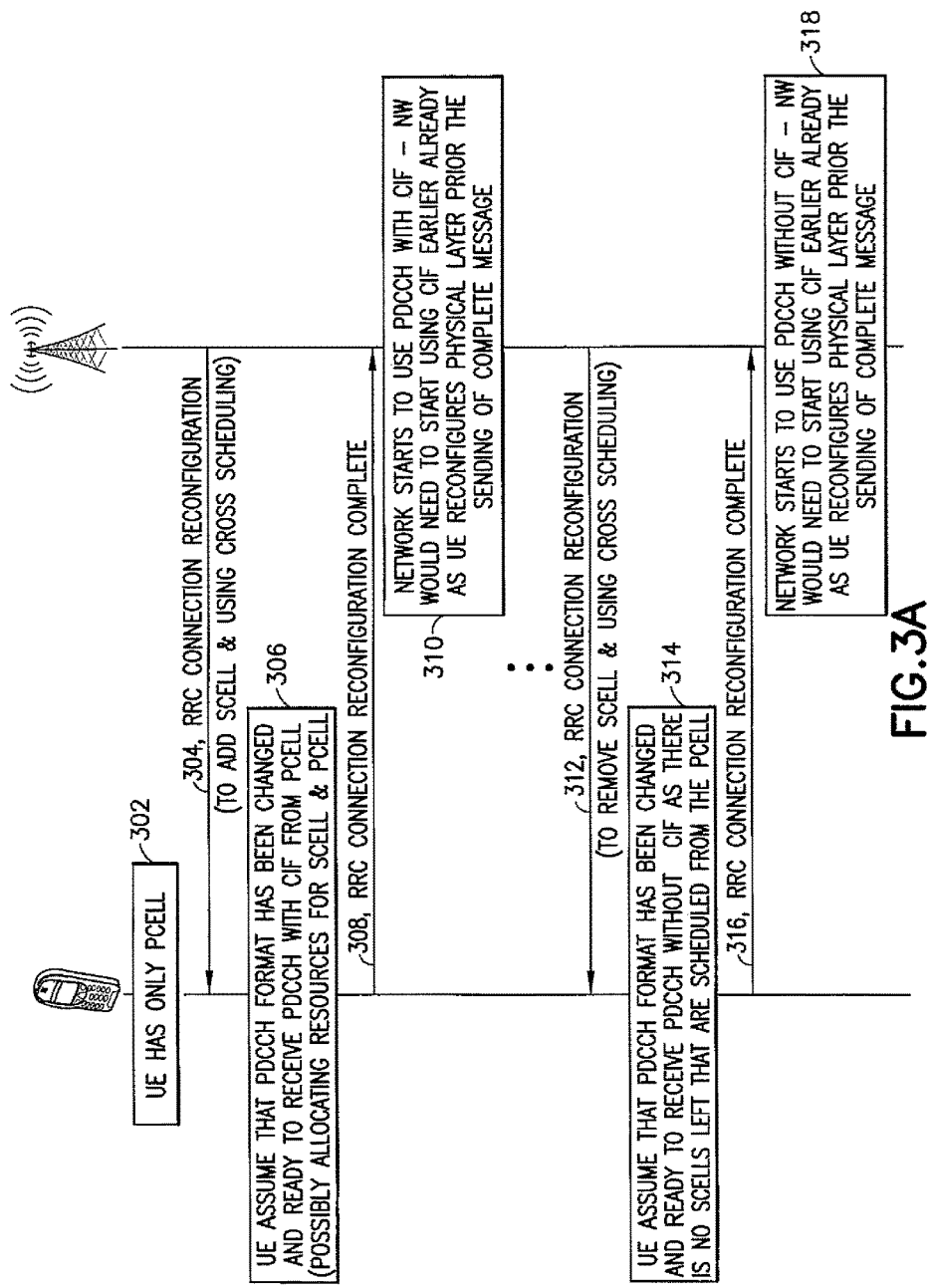
FIG. 3A is an exemplary signaling diagram by which the PDCCH format in a cross-scheduled cell is explicitly signaled with the addition or withdrawal of a SCell from a UE's configured component carrier set according to an exemplary embodiment of the invention.

FIG. 3A is a signaling diagram similar to FIG. 2 but illustrating one particular implementation for the second exemplary embodiment. Like FIG. 2, the starting point of FIG. 3A is that the UE 10 is configured at 302 with only one CC, its PCell. The eNB then adds to the UE's configured set one or more secondary CCs (SCells) which enables cross-scheduling, via a RRC Connection Reconfiguration message 304. This message 304 includes some explicit indication whether the PDCCH format going forward will be with CIF or without CIF. At block 306 the UE changes its PDCCH format from whatever it was previously to match that indicated in the RRC signaling 304, and confirms its compliance with the RRC Connection Reconfiguration message 304 by sending to the eNB 12 a RRC Connection Reconfiguration Complete message 308. Upon receipt of this message 308 the eNB 12 begins at 310 to use the PDCCH having the format indicated or not by the CIF, as was signaled at message 304.

The remainder of FIG. 3A illustrates the reverse situation, where the UE's configured CC set is reduced from more than one cell to only the PCell. The eNB 12 sends to the UE 10 a new RRC Connection Reconfiguration message 312 which removes all the SCells (alternatively this new message 312 may simply indicate that cross-scheduling will not be used, and may or may not also withdraw configured SCells from the UE's configured set). This new message 312 also includes some explicit indication whether the PDCCH format going forward will be with CIF or without CIF. The UE in response at block 314 changes to the PDCCH format which was explicitly signaling at 312 and readies itself to receive PDCCHs of that changed format. The UE then sends a new RRC Connection Reconfiguration Complete message 316, which causes the eNB 12 upon receipt to begin at 318 to use the PDCCH having the format corresponding to that which was indicated at message 312.

From the perspective of the eNB 12, it does not know the exact timing (due to RRC message transmission time uncertainties; there is a time lag between messages 304 and 308 in FIG. 3A for example) when the UE 10 would begin using the signaled and changed PDCCH format. This is noted at blocks 310 and 318 of FIG. 3A. Therefore the eNB 12 should in an embodiment consider both the former and the changed PDCCH formats for a certain minimal time period. As an alternative, the eNB 12 may instead pause its scheduling to that UE 10 for that minimal time period to assure that UE 10 receives the RRC Connection Reconfiguration message (304, 312) and starts to use the changed PDCCH format (with or without CIF, depending on the RRC signaling).

Note that this period of uncertainty at the network side may also exist with the first embodiment in certain implementations. The timing uncertainty exists when the PDCCH format is changed but the PDCCH format does not need to change at every opportunity when the explicit signaling option of the second embodiment is used, so the timing issue is a bit more acute in the first embodiment. Whether a cell is added or removed for a UE depends typically on the traffic volume for the UE, but where cross scheduling is used for the cell the PDCCH format has to be changed at every SCell addition and deletion of the last SCell in the first embodiment where the format change is implicit. To alleviate the time period during which there is uncertainty at the network as to what format the UE is using, at least the second embodiment with explicit signaling does not mandate that the format must be changed each time. So in the second embodiment the eNB has the option of signaling to the UE that the PDCCH format with CIF can be used even if there is no cross scheduling, and the option of signaling that the PDCCH format with CIF will be used even if the UE has only the PCell configured. While the PDCCH format (CIF or no CIF) does not always have to be changed whenever there is a switch to whether a UE can be cross-scheduled or not, all of the switches may advantageously still occur at those PDCCH format changes (less signaling), although PDCCH format can also be changed with a separate RRC message.

Figure 3B:
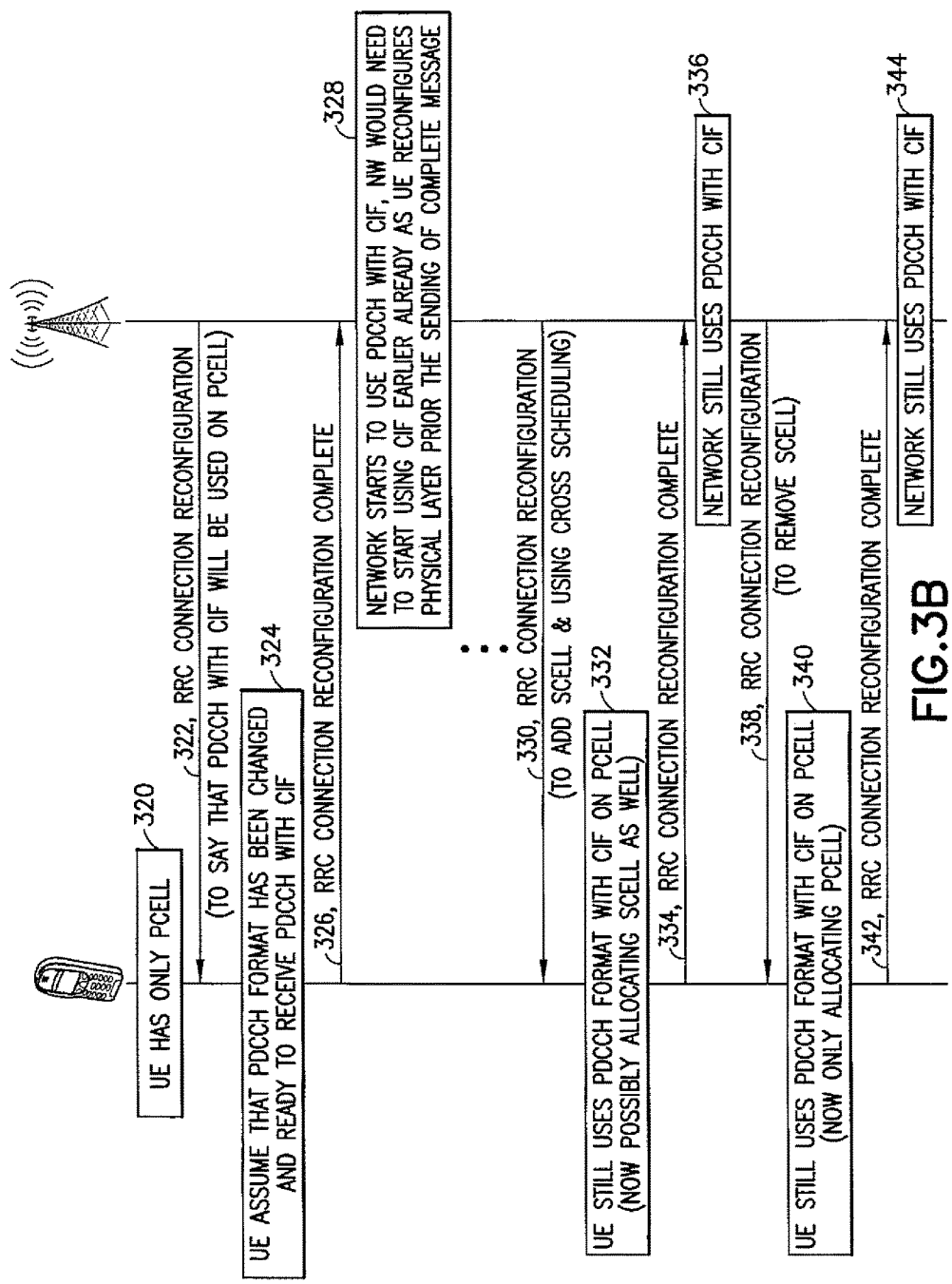
FIG. 3B is an exemplary signaling diagram similar to FIG. 3A showing another exemplary embodiment of the invention.
Figures 2, 4B:
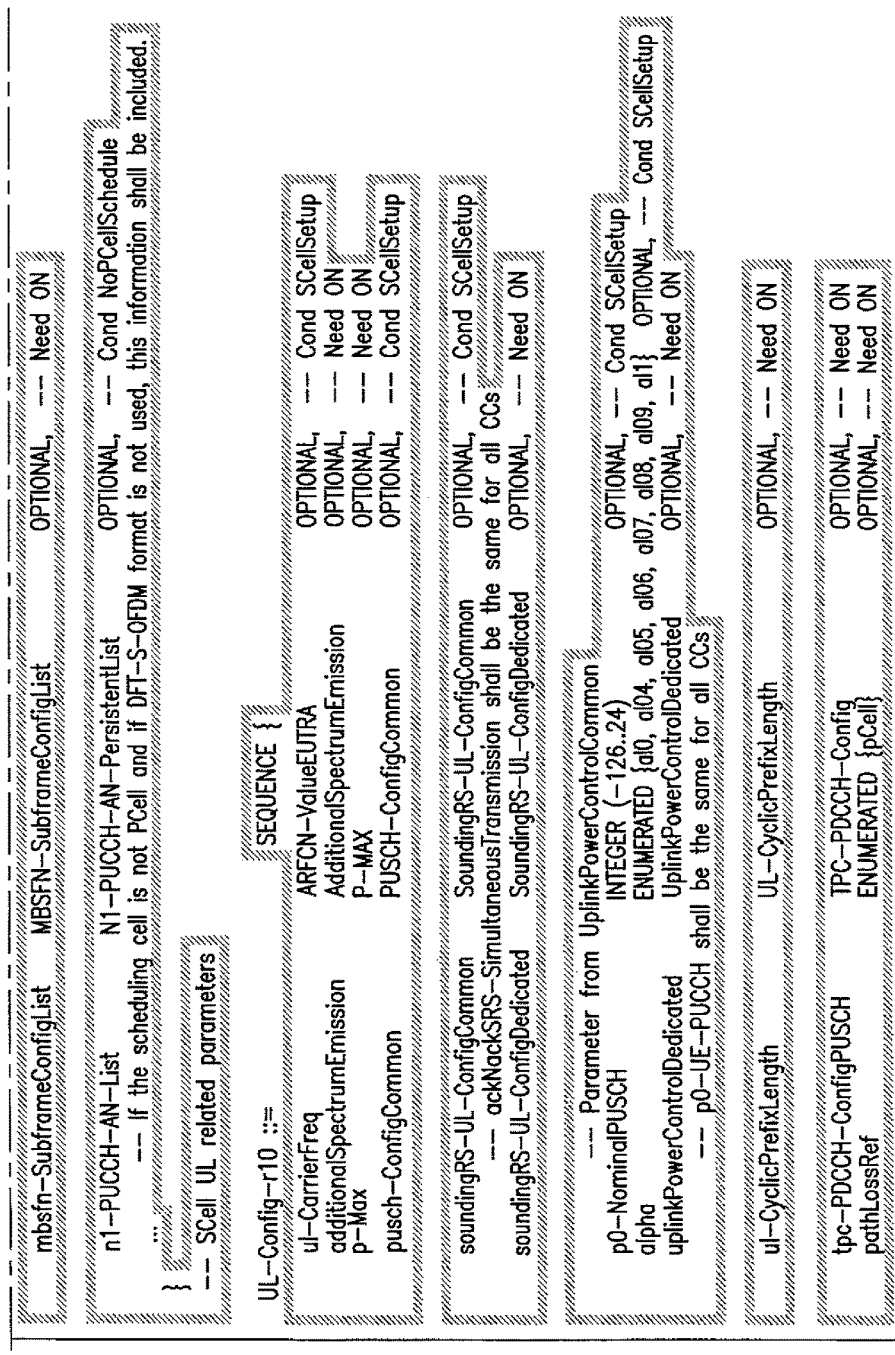

FIG. 3B illustrates a signaling diagram similar in kind to that of FIG. 3A but according to another embodiment of the invention. Like FIG. 3A, the starting point of FIG. 3B is that the UE 10 is configured at 320 with only one CC, its PCell. The eNB then indicates to the UE via a RRC Connection Reconfiguration message 322 that the PDCCH with CIF will be used on that PCell, as above by some explicit indication. At block 324 the UE changes its PDCCH format from the non-CIF format which it was previously to match the CIF format indicated in the RRC signaling 322, and confirms its compliance with the RRC Connection Reconfiguration message 322 by sending to the eNB 12 a RRC Connection Reconfiguration Complete message 326. Upon receipt of this message 326 the eNB 12 begins to use the PDCCH format with CIF as was indicated at message 322. Like block 310 of FIG. 3A, block 328 of FIG. 3B indicates the network/eNB may begin using the PDCCH with CIF format earlier.

At this point there is no cross scheduling yet for the UE has only the PCell in its configured set. At a second RRC Connection Reconfiguration message 330 the eNB adds one or more SCells to the UE's configured set. Block 332 is no change at the UE; it is still looking for the PDCCH with CIF format which it switched to at block 324 but now at block 332 cross scheduling for this UE is possible due to the presence of the SCell. The UE responds with a second RRC Connection Reconfiguration Complete message 334 to confirm its configured set now includes the (one or more) SCell and at block 336 the eNB continues to use the PDCCH with CIF format which it started to use at block 328. At this point cross scheduling is possible, but note the eNB may or may not choose to cross schedule this UE, thus preserving maximum flexibility at the eNB for scheduling its resources.

The remainder of FIG. 3B concerns reducing the UE's configured set back to only the PCell which it started with at block 320. The eNB sends a third RRC Connection Reconfiguration message 338 to the UE which removes the SCell (or all of them if there is more than one SCell) from the UE's configured set. There is no PDCCH format change since in this example there is no explicit indication to do so at the third RRC Connection Reconfiguration message 338, so at block 340 the UE continues to use the PDCCH with CIF that was indicated at message 322 on its PCell. But now the UE has only the PCell in its configured set of carriers and so cross carrier scheduling is not possible in practice regardless of the PDCCH with CIF format. The UE confirms the dropped SCell in the third RRC Connection Reconfiguration Complete message 342 it sends to the eNB, and the eNB in response also continues to use at block 344 the PDCCH with CIF that was originally signaled at message 322.

From FIGS. 3A-B it is clear that the PDCCH for a UE is changed in format between with and without CIF in conjunction with switching the UE between being enabled for cross carrier scheduling and being disabled for cross carrier scheduling. While the relation between these two events may be a true dependence as in the first embodiment using implicit signaling, FIG. 3B particularly shows at messages 322 and 338 that the format change need not always and everywhere occur alongside enabling/disabling the UE for cross scheduling, but where both format change and a change to the UE's capacity to be cross scheduled occur there is a relationship between those two events.

FIG. 4A-D combine into a single table to illustrate an exemplary change to 3GPP 36.331 v9.3.0 (2010-03) to enable the second embodiment detailed above. Specifically, the parameters pcellPDCCHFormatWith CIF which is highlighted at FIG. 4A and scellPDCCH-FormatWithCIFwhich is highlighted at FIG. 4B, along with their related instructions (UsePDCCHFormatWithCIF) within the RadioResourceConfigDedicated information element may be used as the explicit indicator for exemplary implementations of the second embodiment detailed above. To the Radio Resource Configuration-Dedicated information element is added all of the fields indicated in FIG. 4 by highlighting. Notable also is the SCellSetup field, which is conditional if a new SCell is configured. FIG. 4 is adapted to replace the table detailing that same Radio Resource Configuration-Dedicated information element shown specifically at section 6.3.2 of 3GPP 36.331 v9.3.0 (2010-03) at pages 152-153.

Figure 5:
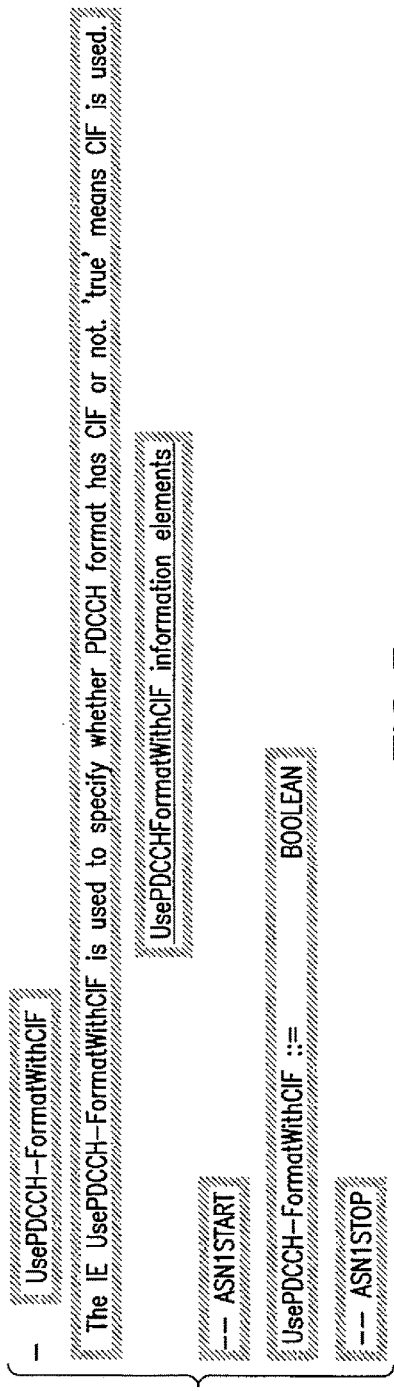
FIG. 5 is another information element to be added to 3GPP TS 36.331 to enable a specific implementation of the second embodiment of the invention detailed herein.

FIG. 5 also details the parameter noted for FIG. 4, UsePDCCHFormatWithCIF, which is a particular implementation for the explicit RRC signaling of the second embodiment detailed above and specifically written for adoption into 3GPP TS 36.331.

Figure 6:
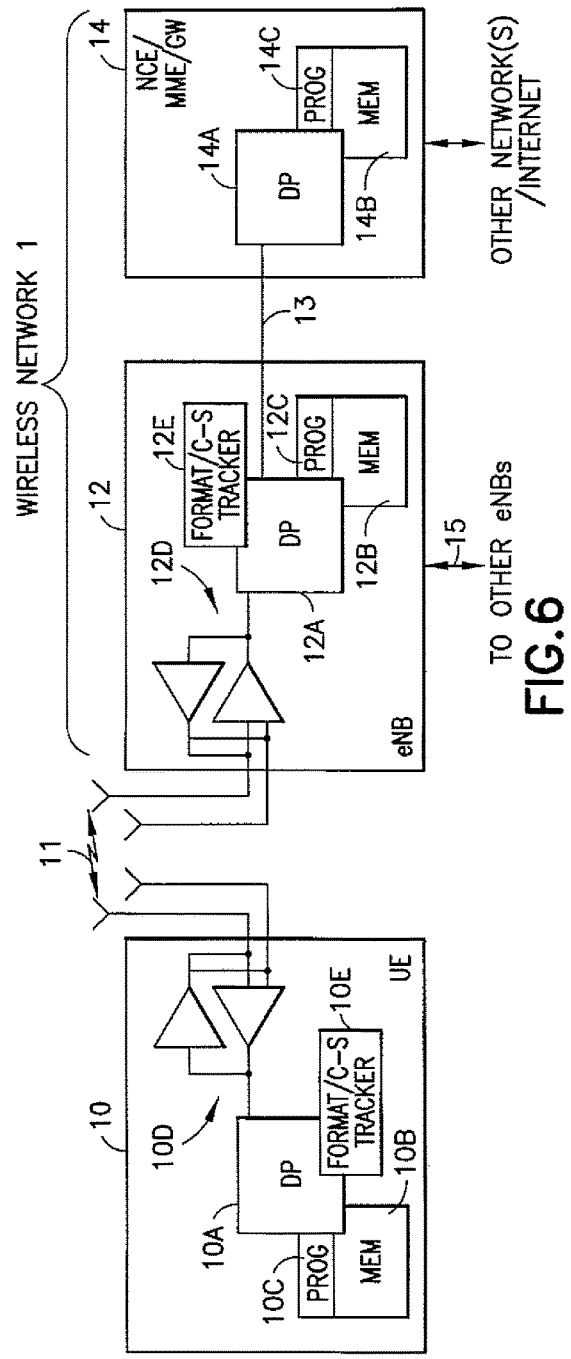
FIG. 6 shows a simplified block diagram of certain apparatus according to various exemplary embodiments of the invention.

Reference is made to FIG. 6 for illustrating a simplified block diagram of various electronic devices and apparatus that are suitable for use in practicing the exemplary embodiments of this invention. In FIG. 6 a wireless network 1 is adapted for communication over a wireless link 11 with an apparatus, such as a mobile communication device which above is referred to as a UE 10, via a network access node, such as a Node B (base station), and more specifically an eNB 12. The network 1 may include a network control element (NCE) 14 that may include the MME/S-GW functionality shown in FIG. 1A, and which provides connectivity with a network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a PDCCH/cross-scheduling tracker 10E which tracks changes between the UE being enabled and disabled for cross-scheduling alongside changes to the PDCCH format which are made in conjunctions with the cross-scheduling enable/disable switches. The eNB 12 has similar functionality at block 12E but the eNB 12 tracks this for multiple UEs.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 7:
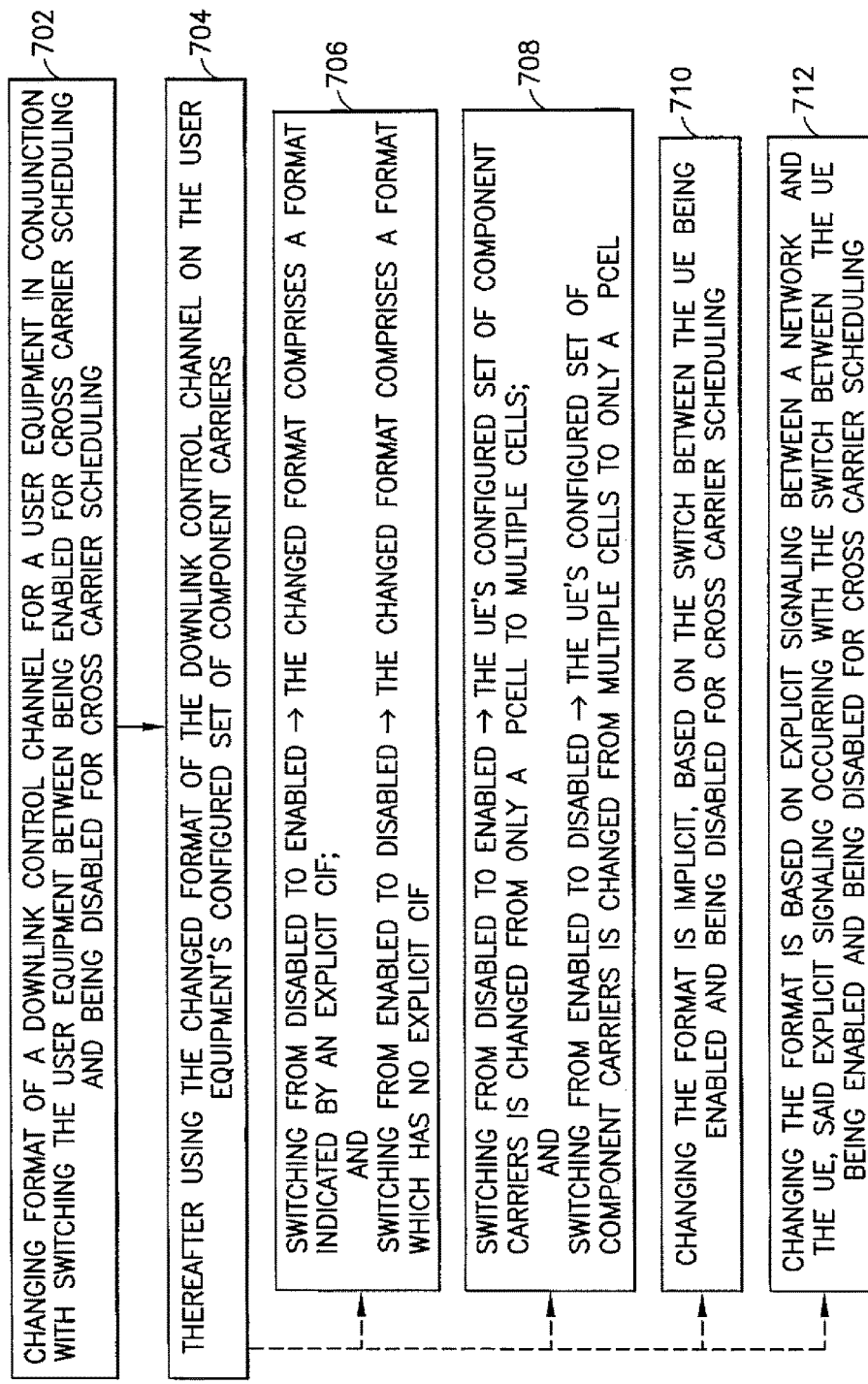
FIG. 7 is a logic flow diagram that illustrates the operation of a method, and a result of execution of computer program instructions embodied on a computer readable memory, in accordance with the exemplary embodiments of this invention.

FIG. 7 is a logic flow diagram that illustrates the operation of a method, and a result of execution of computer program instructions, in accordance with the exemplary embodiments of this invention. In accordance with these exemplary embodiments at block 702 format of a downlink control channel is changed for a UE in conjunction with switching the UE between being enabled for cross carrier scheduling and being disabled for cross carrier scheduling. At block 704 there is, after block 702, using the changed format of the downlink control channel on the UE's configured set of component carriers.

Remaining blocks of FIG. 7 are optional particular embodiments, any or all of which may be combined with blocks 702 and 704 (except blocks 710 and 712 are not combined in the above examples). At block 706, for the case in which the switching is from disabled to enabled for cross carrier scheduling the changed format comprises a format indicated by an explicit carrier indicator field CIF; and for the case in which the switching is from enabled to disabled for cross carrier scheduling the changed format comprises a format which has no explicit carrier indicator field CIF.

At optional block 708 switching from disabled to enabled for cross carrier scheduling is effected by the UE's configured set of component carriers being changed from only a primary cell to multiple cells; and switching from enabled to disabled for cross carrier scheduling is effected by the UE's configured set of component carriers being changed from multiple cells to only a primary cell.

Block 710 concerns the first embodiment above, changing the format of the downlink control channel is implicit based on the switch between the UE being enabled for cross carrier scheduling and being disabled for cross carrier scheduling. Block 712 concerns the second embodiment above, changing the format of the downlink control channel is based on explicit signaling between a network and the UE, in which the explicit signaling occurs with the switch between the user equipment being enabled and being disabled for cross carrier scheduling (i.e., in the RRC Connection Reconfiguration message).

The various blocks shown in FIG. 7 as well as the steps shown at the signaling diagrams of FIGS. 2-3 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE-Advanced system, it should be appreciated that the exemplary embodiments of this invention are not limited for use with only this one particular type of wireless communication system that uses carrier aggregation.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and channels (e.g., PDCCH) are not intended to be limiting in any respect, as these parameters may be identified by any suitable names. The use of LTE-A in the specific examples is not limiting to the broader aspects of this invention, which are viable for many CA systems apart from LTE-A which use cross-scheduling.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
transmitting, to a user equipment, a radio resource control message in a control plane, including an explicit indication of a format that has an explicit carrier indicator field;
changing the format of the downlink control channel for the user equipment from a format which has no explicit carrier indicator field to the format that has an explicit carrier indicator field based on the radio resource control message; and
whereby the user equipment is caused to switch from being disabled for cross carrier scheduling to being enabled for cross carrier scheduling, comprising the user equipment's configured set of component carriers changing from only a primary cell to multiple cells configured to use cross carrier scheduling.

2. A method comprising:
transmitting, to a user equipment, a radio resource control message in a control plane, including an explicit indication of a format that has an explicit carrier indicator field; and
changing the format of the downlink control channel for the user equipment from a format which has no explicit carrier indicator field to the format that has an explicit carrier indicator field based on the radio resource control message; and thereafter
the user equipment switches from being disabled for cross carrier scheduling to being enabled for cross carrier scheduling, comprising the user equipment's configured set of component carriers having added thereto a secondary cell configured to use cross carrier scheduling.

3. A method comprising:
changing format of a downlink control channel for a user equipment from a format which has no explicit carrier indicator field to a format that has an explicit carrier indicator field; and thereafter
switching the user equipment from being disabled for cross carrier scheduling to being enabled for cross carrier scheduling, the switching comprising adding to the user equipment's configured set of component carriers a secondary cell configured to use cross carrier scheduling,
in which changing the format of the downlink control channel is based on explicit signaling between a network and the user equipment.

* * * * *